United States Patent [19]

Hummert, III

[11] Patent Number: 5,137,057

[45] Date of Patent: Aug. 11, 1992

[54] FLEXIBLE DUCT AND METHOD OF SUSPENDING A DUCT

[76] Inventor: August H. Hummert, III, 2746 Chouteau Ave., St. Louis, Mo. 63103

[21] Appl. No.: 357,523

[22] Filed: May 26, 1989

[51] Int. Cl.[5] .................. F16L 11/04; F16L 11/12; F16L 11/115

[52] U.S. Cl. .................. 138/107; 138/106; 138/118; 138/128; 138/172; 138/170; 454/903; 248/61; 156/203

[58] Field of Search ............. 24/500, 507, 508, 509; 138/107, 118, 119, 128, 171, 106, 156, 170, 172; 98/40.19, DIG. 7; 248/58, 61, 63, 74.2, 316.1, 316.5; 428/35.7, 36.9, 36.92; 264/154, 155, 156; 156/203, 218, 253

[56] References Cited

U.S. PATENT DOCUMENTS

| | | | |
|---|---|---|---|
| 1,635,957 | 8/1926 | Richardson | 138/107 |
| 1,833,704 | 11/1931 | Bins | 138/107 |
| 1,871,570 | 12/1930 | Weber | 52/3 |
| 2,013,724 | 5/1934 | Brady | 138/107 |
| 2,091,265 | 8/1937 | Brown | 138/107 |
| 2,522,346 | 9/1950 | Carson et al. | 138/128 |
| 2,671,041 | 3/1954 | Dodge | 156/203 |
| 3,095,908 | 3/1959 | Plummer | 138/107 |
| 3,225,408 | 5/1964 | Durham | 24/265 |
| 3,272,235 | 10/1963 | Haytock et al. | 138/107 |
| 3,357,088 | 12/1967 | Hoffman et al. | 138/107 |
| 3,520,244 | 5/1968 | Gaines, Jr. | 454/277 |
| 3,528,876 | 9/1970 | Bouhaben et al. | 156/203 |
| 3,689,687 | 9/1972 | Bosch | 248/316.5 |
| 3,885,593 | 5/1975 | Koerber et al. | 138/131 |
| 4,023,589 | 5/1977 | Rejeski | 138/156 |

FOREIGN PATENT DOCUMENTS 67454 8/1948 Denmark .
1956659 6/1970 Fed. Rep. of Germany .

*Primary Examiner*—Harvey C. Hornsby
*Assistant Examiner*—Gary Graham
*Attorney, Agent, or Firm*—Senniger, Powers, Leavitt & Roedel

[57] ABSTRACT

A flexible duct adapted to be suspended from a support and method of making same. The duct comprises a conduit of heat-sealable plastic film having a longitudinally extending fin on the conduit for suspending the conduit. The fin comprises first and second face-to-face layers of heat sealable film. The fin includes spaced apart reinforced regions which are adapted for engagement with fasteners for suspending the conduit. The reinforced regions comprise portions of the first and second layers which are heat-sealed together. According to the method, a duct is made from an elongate tube of flexible heat sealable material. The sidewall of the tube is joined to itself along a longitudinal line to define a first relatively larger tube forming a longitudinally extending conduit, and a second relatively smaller tube forming a longitudinally extending double-walled fin for suspending the duct. Portions of the double walls of the fin are then heat-sealed together to form longitudinally spaced reinforced regions for engagement by means for suspending the conduit.

2 Claims, 2 Drawing Sheets

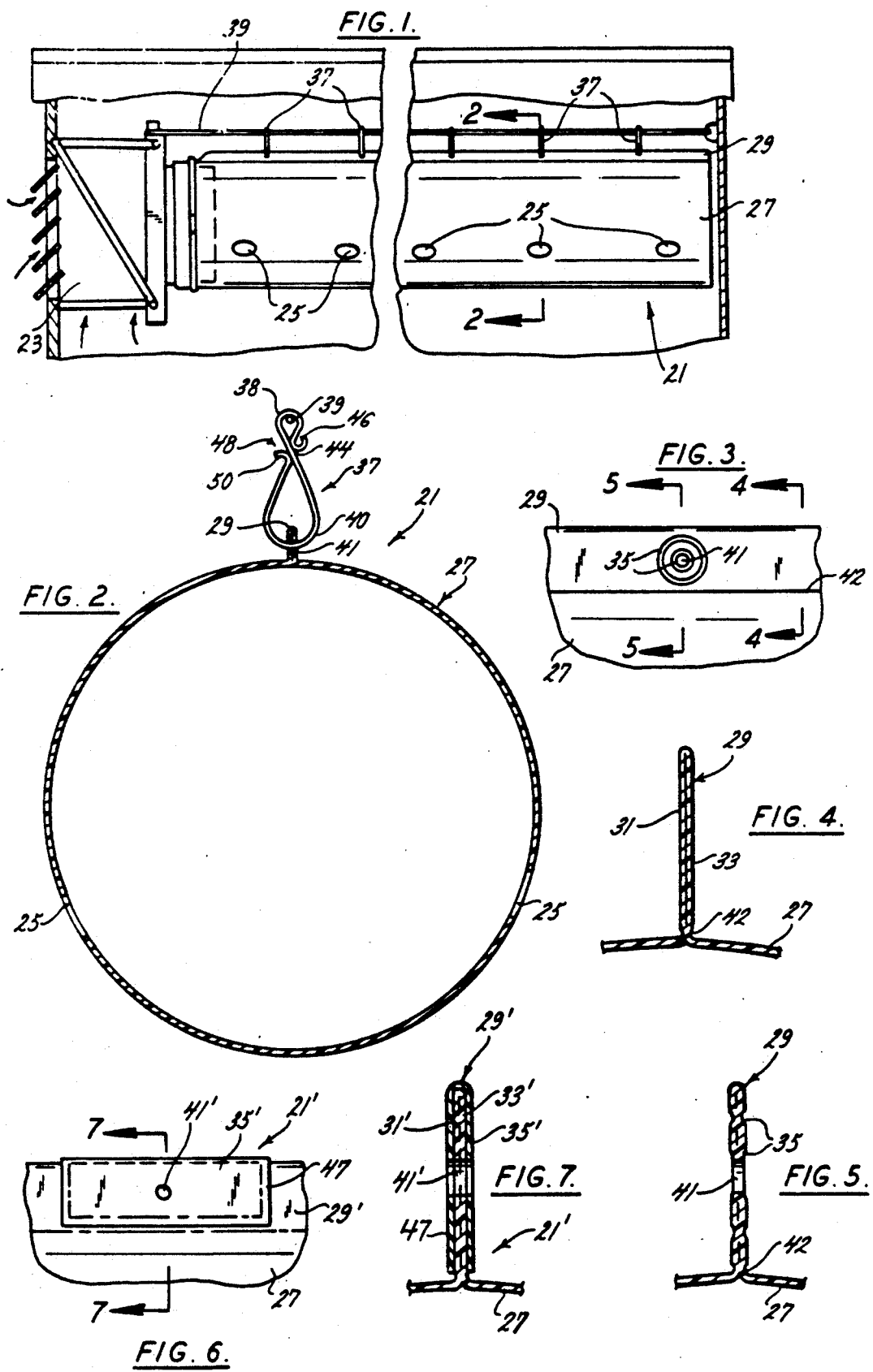

FLEXIBLE DUCT AND METHOD OF SUSPENDING A DUCT

BACKGROUND OF THE INVENTION

This invention relates to ducts, and more particularly to flexible ducts and method of making same.

Tubing made from thin flexible plastic film is widely used for overhead ducts to heat and ventilate greenhouses and similar structures. Such thin-walled tubing, known commercially as convection tubing, provides convenient and inexpensive ventilation and heating but is difficult to install and tends to tear easily. As the tubing is typically suspended from an overhead wire which is frequently as high as sixteen feet above the floor its installation has required climbing a ladder to affix the tubing at spaced apart points to the wire. In addition to the hazards of installation, fallen tubing can also cause serious problems. If tubing tears it can fall and crush delicate plants as well as interrupt heating and ventilation thus also causing damage to plants.

There are numerous ways to suspend tubing from a horizontal overhead wire such as by a plurality of clamp-type hangers or by loops of cord encompassing the duct and wire qirthwise. In the clamp-type hanger, a flat bar positioned inside the tubing is inserted in a channel positioned outside the tubing so that a portion of the tubing is clamped between the bar and channel. A snap ring is then inserted through an aperture in the channel and around the overhead wire to suspend the bar, channel, and tubing from the wire. Suspending the tubing with such clamp-type hangers is generally a time-consuming and tedious task. Additionally, as such hangers are relatively costly and many are required to suspend the tubing, use of such hangers is somewhat expensive. While the use of spaced apart loops of cord is less expensive, the installation is time-consuming and as with the other known ways of suspending the duct the installation requires the use of ladders.

SUMMARY OF THE INVENTION

Among the objects of the present invention is the provision of a flexible duct adapted to be suspended from a support in a greenhouse or similar structure; the provision of such a duct which has greatly reduced tendency to tear and fail when suspended; the provision of such a duct which is adapted to be suspended quickly and easily and without the use of ladders; and the provision of such a duct which is of simple and inexpensive construction. It is also among the objects of the present invention to provide a convenient and economical method of manufacturing such a duct and a convenient and economical method of installing such a duct.

In general, the duct of this invention is adapted to be suspended from a support and comprises a conduit of heat-sealable plastic film having a longitudinally extending fin on the conduit for suspending the conduit. The fin comprises first and second face-to-face layers of heat sealable film. The fin includes spaced apart reinforced regions which are engageable by means for suspending the conduit. The reinforced regions comprise portions of the first and second layers which are heat-sealed together.

In general, according to the method of manufacturing a duct of the present invention, a duct is made from an elongate tube of flexible heat sealable material. The sidewall of the tube is joined to itself along a longitudinal line to define a first relatively larger tube forming a longitudinally extending conduit, and a second relatively smaller tube forming a longitudinally extending double-walled fin for suspending the duct. Portions of the double walls of the fin are then heat-sealed together to form longitudinally spaced reinforced regions for engagement by means for suspending the conduit.

In general, according to a method of the present invention, a duct is suspended from a wire. The duct comprises an elongate conduit of heat-sealable plastic film with a longitudinally extending fin which has a plurality of spaced apart reinforced regions each having an aperture. The hangers each have a hook at one end shaped for releasable snap engagement of the wire and for being retained thereon and means at the other end for extending through an aperture to releasably engage the fin. The fin is engaged at one of its apertures with one of the hangers. The hanger is then gripped with an extension rod having jaws at one end adapted to releasably grip the hangers. The hanger and a portion of the duct adjacent the hanger are then elevated by the extension rod. The wire is then engaged by the hook of the hanger so that the portion of the duct adjacent to the hanger hangs from the wire. The extension rod is then released from the hanger. The extension rod is then repeatedly used to loop all of the other hangers around the wire to suspend the duct from the wire.

Other objects and features will be in part apparent and in part pointed out hereinafter.

BRIEF DESCRIPTION OF THE DRAWINGS

FIG. 1 is a side elevation of a flexible duct of the present invention as installed within a building;

FIG. 2 is an enlarged vertical section on line 2—2 of FIG. 1 showing the duct suspended from a hanger;

FIG. 3 is an enlarged partial side elevation of the duct showing a reinforced region of the fin of the duct;

FIG. 4 is an enlarged vertical section on line 4—4 of FIG. 3 showing the fin;

FIG. 5 is an enlarged vertical section on line 5—5 of FIG. 3 showing the reinforced region;

FIG. 6 is an enlarged partial side elevation of a duct showing another embodiment of a reinforced region;

FIG. 7 is an enlarged vertical section on line 7—7 of FIG. 6; and

Corresponding reference characters indicate corresponding parts throughout the several views of the drawings.

DESCRIPTION OF PREFERRED EMBODIMENTS

Figure 8:
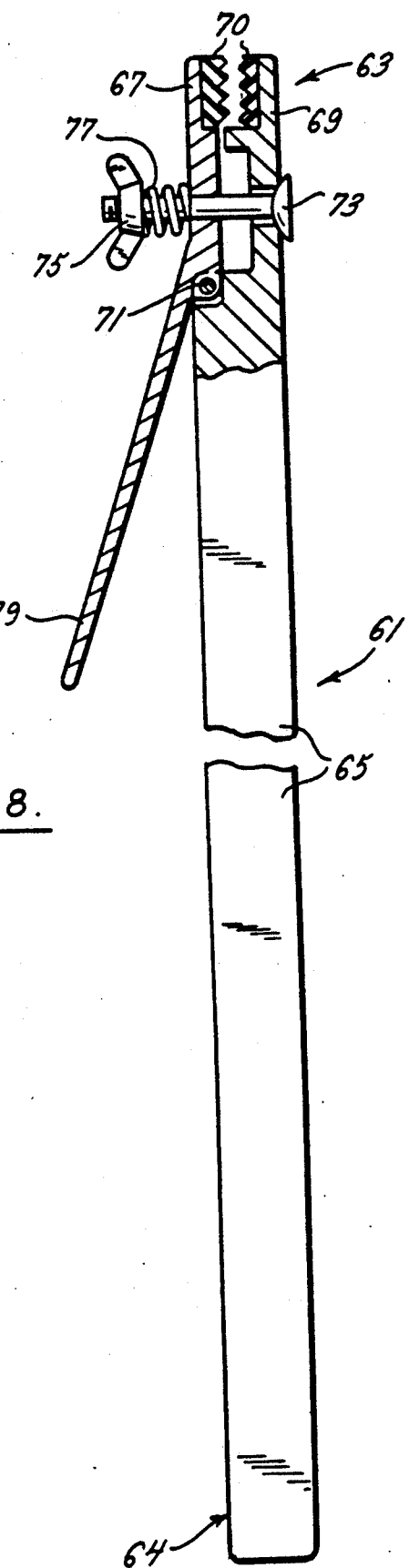
FIG. 8 is an elevation view showing an elongate extension rod adapted to be used for suspending a duct from a wire.

A duct constructed according to the principles of this invention, indicated generally as 21, is shown in FIG. 1 as it would be suspended from an overhead support wire in a greenhouse. One end of duct 21 is connected to a fan 23 which forces air through duct 21 for transfer and distribution of pressurized air through vents 25 in the wall of the duct. The duct 21 comprises a longitudinally extending air conduit 27 and a longitudinally extending double-walled fin 29 on top of the conduit 27, adapted for suspending the duct 21. Both the conduit 27 and the fin 29 are formed of a heat-sealable plastic film material, such as polyethylene film having a typical thickness of 4 mils.

Fin 29 comprises first and second face-to-face layers 31 and 33 of the heat-sealable film. Fin 29 further includes a plurality of spaced apart reinforced regions 35 (shown in FIGS. 3 and 5). In this embodiment these regions comprise portions of the first and second layers 31 and 33 which are heat-sealed together. The heat-sealing joins layers 31 and 33 together so that the reinforced regions 35 are thicker than each of the individual layers 31 and 33, (see FIG. 5) and therefore are more resistant to tearing or other failure than layers 31 and 33.

As shown in FIG. 2, each reinforced region 35 has an aperture 41 dimensioned for receiving an S-shaped hanger 37. The hanger 37 is resilient and may be made of metals, alloys, or synthetic resins. The hanger 37 comprises an upper bight (or hook) 38 and a lower bight 40. The lower bight 40 is threaded through the aperture 41 and the upper bight 38 is looped around an overhead support such as a taut wire 39 extending through the greenhouse. The upper bight 38 has a downwardly opening throat 44 narrower than the diameter of the wire 39 and an outwardly directed free end 46. The lower bight 40 has an upwardly opening throat 48 and an outwardly directed free end 50. Because free ends 46 and 50 are directed outwardly, lower bight 40 is easily threaded through aperture 41 and upper bight 38 is easily snapped over wire 39. To loop upper bight 38 around wire 39, free end 46 is first placed over wire 37 so that wire 37 is adjacent throat 44. As the hanger 37 is pulled downward, wire 39 forces free end 46 outward to open throat 48 so that the upper bight 38 loops around wire 39. After throat 48 passes over wire 39 free end 46 snaps closed so that hanger 37 is securely attached to wire 39. Hangers 37 and wire 39 constitute suspension means for suspending the duct 21 within the greenhouse. Preferably, each reinforced region 35 is circular and the apertures 41 are concentrically disposed within the reinforced regions 35 to minimize the likelihood of tearing fin 29. Thus, the reinforced regions 35 reduce the likelihood of suspension failure.

According to the method of this invention, the duct 21 is preferably formed of an elongate seamless tube (see FIG. 4), such as a heat-sealable polyethylene tube or other suitable material. The wall of the tube 43 is joined to itself by heat-sealing along a longitudinally extending line 42 to define a first relatively larger tube forming the longitudinally extending conduit 27 and a second relatively smaller tube forming the longitudinally extending double-walled fin 29. Longitudinally spaced portions of the layers 31 and 33 forming the double walls of the fin 29 are then heat-sealed together to form the reinforced regions 35. . Apertures 41 are formed in reinforced regions 35 for receiving the hangers 37. The hangers 37 constitute means for suspending the conduit 27. Thus, a reinforced flexible duct can be made simply and economically from a seamless flexible tube.

FIGS. 6 and 7 show a second embodiment 21' of the duct of this invention. The duct 21' is similar to duct 21 except that strips 47 of flexible sheet material are folded over the top of the fin 29' and heat-sealed thereto to form reinforced regions 35'. Since the strips 47 are folded over the fin 29' each reinforced region 35' is four times thicker than each individual layer 31' or 33'. Preferably, the height of each reinforced region 35' is substantially equal to the height of fin 29' and the apertures 41' are centered heighthwise and widthwise within the reinforced regions 35 to minimize the likelihood of tearing fin 29. The strips 47 may be heat-sealed to the fin at the same time layers 31' and 33' are heat-sealed together or after the layers have been heat-sealed. Alternatively, the strips may be two separate strips (not shown) placed on opposite sides of the fin 29' and heat-sealed thereto.

The duct 21 is easily formed in a continuous manner by first forming a tube from a heat-sealable film or starting with a seamless tube of heat-sealable material. The walls of the tube are joined by heat-sealing along a continuous, longitudinally extending line to define a conduit and a double-walled fin. The walls of the fin are intermittently heat-sealed together to form longitudinally spaced reinforced regions 35. The apertures 41 are formed in the reinforced regions, for example by punching. Such apertures may be formed either before, during, or after formation of the reinforced regions Greater thickness of the reinforced regions 35 provides greater resistance to tearing than the thinner individual layers 31 and 33. Thus the hangers are less likely to tear through the reinforced regions 35 than the separate layers, and thus the duct 21 is less prone to collapse or other failure.

The duct 21 is quickly and easily suspended from an overhead support such as wire 39 by a long handle hanger tool such as extension rod 61 (shown in FIG. 8). With extension rod 61, a person can suspend duct 21 from the wire 39 without using a ladder. Extension rod 61 has jaws 63 at one of its end which are adapted to releasably grip hanger 37, a handle portion 64 at its other end, and an elongate intermediate portion 65. Jaws 63 comprise first and second jaw portions 67 and 69 having pads 70, preferably made of an elastomeric material such as rubber, for grasping hanger 37. The first jaw portion 67 is pivotally connected to the intermediate portion 65 by a hinge 71. A bolt 73, wing nut 75, and compression spring 77 cooperate to bias jaw portions 67 and 69 toward each other. Bolt 73 extends through jaw portions 67 and 69 and mates with wing nut 75. Compression spring 77 is coaxially disposed about bolt 73 and is positioned between wing nut 75 and jaw portion 67. By turning wing nut 75 on bolt 73, the clamping force of jaw portions 67 and 69 can be adjusted. A lever arm 79 is fixed to and projects from first jaw portion 67. The lever arm 79 enables a user to open jaw portions 67 and 69 so that a portion of hanger 37 can be inserted between jaw portions 67 and 69. If desired, a wire or cord could be attached to the lower end of arm 79 so that the jaws may be operated from the handle end of the tool.

To suspend duct 21 from wire 39, the lower bight 40 of one of the hangers 37 is first threaded through one of the apertures 41. Hanger 37 is then releasably gripped by jaws 63 of extension rod 61. Hanger 37 and duct 21 are then elevated so that the throat 44 of upper bight 38 is positioned directly over and adjacent wire 39. Extension rod 61 then pulls hanger 37 downward so that wire 39 passes through throat 44 and is engaged by upper bight 38. After hanger 37 is looped around wire 39, extension rod 61 is disengaged from hanger 37 by pulling it downwardly. The other hangers 37 are then looped around wire 39 in the same manner. Thus, duct 21 is suspended from wire 39 without the need of a ladder.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. In combination, a flexible duct adapted to be suspended from a generally horizontal overhead wire for transfer and distribution of pressurized air, and a plurality of resilient hangers for suspending the duct from the wire, the flexible duct comprising an elongate conduit of heat-sealable plastic film with a longitudinally extending fin for suspending the conduit, the fin comprising first and second face-to-face layers of the heat-sealable film and apertures through the layers and spaced at intervals along the fin, the first and second layers being heat-sealed at regions around the apertures to form reinforced regions around the apertures, each hanger being generally S-shaped with a first hook at one end shaped for releasable snap engagement of the wire and for being retained thereon and a second hook at the other end of the hanger for releasably engaging one of the apertures in the fin and for being releasably gripped by jaws at one end of an extension rod whereby the second hook may be engaged in an aperture in the fin and releasably gripped by the jaws and the conduit raised overhead so that the hanger hook may be snapped over the overhead wire thereby permitting suspension of the conduit from a wire located high overhead without the use of a ladder.

2. A method of suspending a flexible duct from an overhead support wire by resilient generally S-shaped hangers, the duct comprising an elongated conduit of heat-sealable plastic film with a longitudinally extending fin having apertures spaced at intervals along the fin and reinforced regions around the apertures, the hangers each having a first hook at one end shaped for releasable snap engagement of the wire and for being retained thereon and a second hook at the other end for extending through an aperture to releasably engage the fin, the method comprising the steps of:

(a) engaging the fin at one of its apertures with the second hook of one of the hangers;
(b) gripping said one of the hangers with an extension rod having jaws at one end adapted to releasably grip the hangers;
(c) elevating said one of the hangers and a portion of the duct adjacent said one of the hangers with the extension rod;
(d) snap engaging the first hook of said one of the hangers around the wire so that said portion of the duct hangs from the wire;
(e) releasing the extension rod from said one of the hangers; and
(f) repeating steps a–e for each hanger to suspend the duct from the wire.

* * * * *